May 16, 1939.  C. T. BOWEN  2,158,104
ARM REST FOR FISHING POLES
Filed Jan. 23, 1937
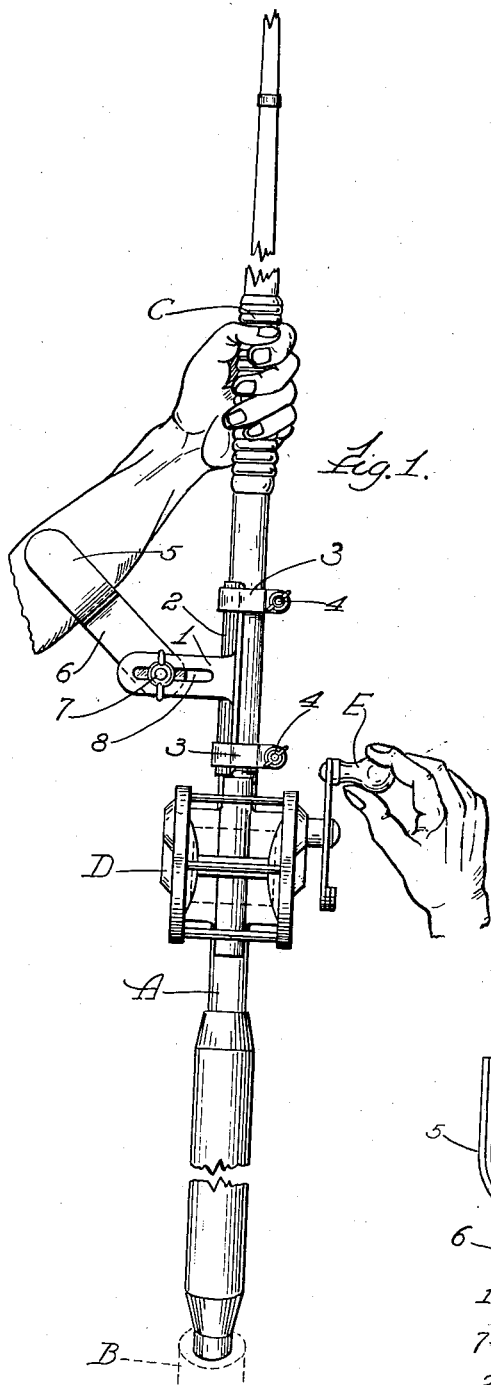
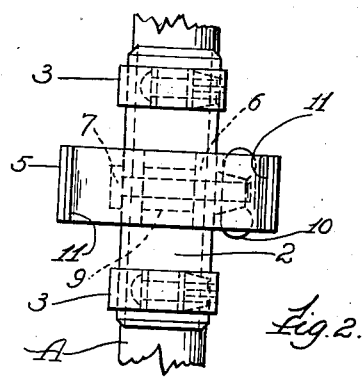
Fig. 2.
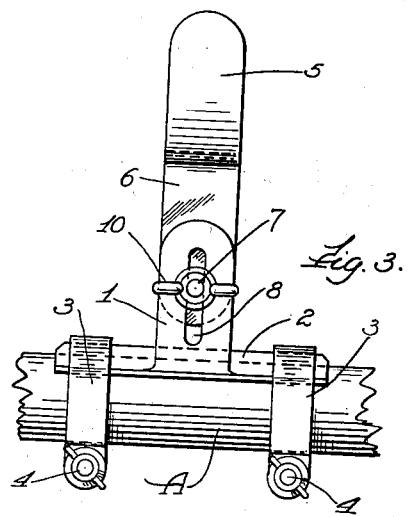
Fig. 3.
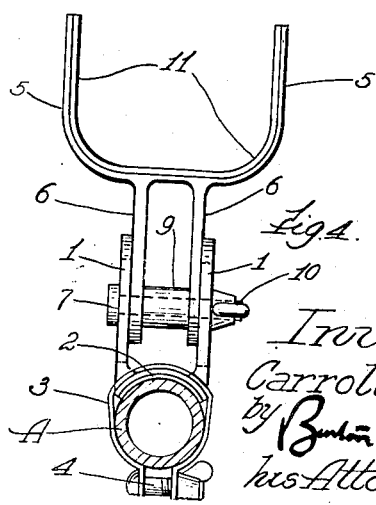
Fig. 4.
Inventor
Carroll T. Bowen
by Burton & Burton
his Attorneys
Witness
H. F. McKnight Patented May 16, 1939

2,158,104

UNITED STATES PATENT OFFICE 2,158,104

ARM REST FOR FISHING POLES

Carroll T. Bowen, Miami, Fla.

Application January 23, 1937, Serial No. 121,958

8 Claims. (Cl. 43—25)

This invention relates to fishing rods or poles, and is particularly applicable to those used in landing fairly large fish. One object of the invention is to provide an arm-rest or brace for steadying the rod, especially when reeling in the line so as to absorb the reactive forces set up by operation of the reel without the exertion of undue muscular effort on the part of the fisherman. Another object is to provide a device for this purpose in a form readily detachable from the rod, and also to render such device adjustable to suit the comfort and convenience of a particular user. The invention consists of certain features and elements of construction in combination, as herein shown and described and as indicated by the claims.

In the drawing:

Figure 1 is an elevation of a fishing rod with parts broken away to condense the view, but showing the handle portion with the reel as viewed by the fisherman holding and operating it, and with the device embodying this invention applied thereto.

Figure 2 is a detail view of the arm-rest device looking directly toward the base, with the arm-rest member adjusted at right angles to the base instead of obliquely, as in Figure 1.

Figure 3 is a side elevation of the device adjusted as illustrated in Figure 2.

Figure 4 is an elevation of the device looking in the direction of the axis of the fishing rod to which it is attached.

As shown in Figure 1 the outer-end portion of the fishing rod from which the line leads is broken away, and only the butt or handle end A is shown. This includes the extreme butt portion which is frequently fitted into a socket shown in dotted lines at B, this socket being carried in a harness attached to the fisherman's body, or being embodied in a fitting which is secured to his chair. The rod may include a handgrip portion, indicated at C, and at an intermediate portion the usual reel is shown at D, attached to the rod. For the sake of simplicity the drawing omits the line which, it will be understood, is wound on the reel D and which is pulled in by operating the hand crank E when the fisherman is ready to land a fish. Although the butt of the rod is steadied in a socket B the operation of the crank E extending from the reel at one side of the rod, tends to twist the rod about its own axis, and, ordinarily, this tendency is overcome as far as possible by the firm grip of the fisherman's hand at C. This reaction or strain increases with the weight of the fish which is being landed, but can be largely eliminated by the use of the device which is the subject of this invention.

This device includes a pair of bracket arms 1, 1 upstanding from a base or foot-piece 2 whose under surface is concavely formed to fit upon the rod A and to be secured thereto in any convenient manner, as by bands 3 provided with clamping bolts 4. The arm-rest member comprises an outwardly open U-shaped yoke portion or cuff 5 with a pair of supporting arms 6, 6 extending from it between the bracket arms 1, 1. A clamping bolt 7 extends through pivot apertures in the arms 6, 6 and through slots 8 in the arms 1, 1 with a spacer sleeve 9 carried on the bolt between the arms 6, 6 and with a wing nut 10 applied to the bolt 7. This permits the effective length of the device to be varied by adjustment of the bolts in the slots 8, 8 and also allows the arm-rest member to be adjusted angularly to the most comfortable and convenient position, as indicated in Figure 1. This view shows the left hand grasping the rod at C, with the right hand operating the crank E of the reel D and illustrates the cuff or yoke 5 of the arm-rest as engaging the left fore-arm so as to prevent twisting of the rod about its axis as the reel is operated. Preferably, the inner surface of the U-shaped yoke or cuff 5 is lined with fabric or leather padding at 11; it will be evident that when the arms 6 are adjusted at the proper angle to the bracket arms 1 the yoke will engage the fore-arm of the user in a comfortable manner, while at the same time serving efficiently to check any tendency of the rod to turn in the hand at C, by reason of the twisting strain set up by the operation of the reel.

If the user prefers to operate the reel with his left hand and grasp the rod at C with the right hand, the arm-rest or brace may be readily adjusted to such use so that it shall project from the right-hand side of the rod A and at whatever angle is most convenient for the particular user. And whenever it is not required the device can be readily removed from the rod by disengaging the clamping bands 3.

Thus it will be seen that I have provided an auxiliary arm rest serving as a brace to absorb the twisting strain incident to operating the reel on a fishing rod, and that, as shown and described, this device is of simple design, economical to manufacture and adapted to be quickly and easily applied to the rod whenever conditions render its use desirable. When not required, it may be readily removed and stored in the fisherman's kit. And by reason of the pivotal and slotted connection between the arms 6, 6 forming the stem of the yoke 5 and the arms 1, 1 of the base, the yoke may be conveniently adjusted to fit any user comfortably and efficiently. While there is shown and described herein certain specific structure embodying the invention, it will be manifest to those skilled in the art that various modifications and re-arrangements of the parts may be made without departing from the spirit and scope of the invention, and that the same is not limited to the particular form herein shown and described, except in so far as indicated by the appended claims.

I claim:

1. In combination with a fishing rod and a reel mounted thereon, an arm secured rigidly to the rod and extending laterally therefrom having an outwardly open yoke positioned to engage upper and under surface of the fore-arm of the hand which grasps the rod.

2. In combination with a fishing rod and a reel mounted thereon, with its crank extending laterally from the rod, an arm extending laterally from the rod at the opposite side and formed at its outer end to engage upper and under surface of the fore-arm of the hand which grasps the rod for steadying the rod against the reaction set up by operation of the crank.

3. An arm-rest including a base, and means for securing it rigidly to a fishing rod, an arm projecting from the base transversely of the rod, and a yoke at the outer end of the arm formed to embrace the fore-arm of the user for steadying the rod in his grasp.

4. In combination with a fishing rod, a brace for the purpose indicated comprising an elongated base adapted to be fastened to the side of the rod, a U-shaped yoke and a stem connecting said yoke in rigid relation to the base.

5. In combination with a fishing rod, a brace for the purpose indicated comprising a base adapted to be fastened to the rod, an arm projecting from the base, a U-shaped yoke, a stem rigid therewith and means by which said stem is adjustably connected to said arm for varying the distance of the yoke from the base.

6. In combination with a fishing rod, a brace for the purpose indicated comprising a base adapted to be fastened to the rod, a U-shaped yoke and pivotal means connecting the yoke to the base with clamping means for securing the yoke at a desired angular relation to the base.

7. In combination with a fishing rod, a brace for the purpose indicated comprising a base and means for removably securing it to the rod, an arm projecting from the base, a U-shaped yoke, a stem rigid with said yoke, and a clamping bolt connecting the stem to the arm, one of said connected parts being slotted and the bolt extending through the slot which permits varying the distance of the yoke from the base.

8. In combination with a fishing rod, a brace comprising an elongated base with means for attaching it to the rod, an arm extending transversely from said base, a U-shaped yoke with a stem pivotally connected to said arm, the connection including a clamping bolt and said arm being slotted, the bolt extending through the slot in said arm to allow angular adjustment of the yoke with respect to the rod and to permit varying its distance therefrom.

CARROLL T. BOWEN.